(12) United States Patent
Ahiman

(10) Patent No.: US 12,723,904 B2
(45) Date of Patent: Sep. 1, 2026

(54) SAP FLOW SENSOR AND METHOD OF DETERMINING SAP FLOW VELOCITY

(71) Applicant: TREETOSCOPE LTD, Tel-Aviv (IL)

(72) Inventor: Ori Ahiman, Mata (IL)

(73) Assignee: TREETOSCOPE LTD (IL)

( * ) Notice: Subject to any disclaimer, the term of this patent is extended or adjusted under 35 U.S.C. 154(b) by 379 days.

(21) Appl. No.: 18/558,435

(22) PCT Filed: May 1, 2022

(86) PCT No.: PCT/IL2022/050444

§ 371 (c)(1),
(2) Date: Nov. 1, 2023

(87) PCT Pub. No.: WO2022/234564

PCT Pub. Date: Nov. 10, 2022

(65) Prior Publication Data

US 2024/0175735 A1 May 30, 2024

Related U.S. Application Data

(60) Provisional application No. 63/184,536, filed on May 5, 2021.

(51) Int. Cl.
*G01F 1/696* (2006.01)
*G05B 19/042* (2006.01)
*A01G 7/00* (2006.01)

(52) U.S. Cl.
CPC ........... *G01F 1/696* (2013.01); *G05B 19/042* (2013.01); *A01G 7/00* (2013.01); *G05B 2219/2625* (2013.01)

(58) Field of Classification Search
CPC .......... G01F 1/696; G01F 25/10; G01F 1/684; G01F 1/692; G01F 1/688; G05B 19/042; G05B 2219/2625; A01G 7/00
See application file for complete search history.

(56) References Cited

U.S. PATENT DOCUMENTS 4,745,805 A * 5/1988 Granier .............. G01N 33/0098 47/1.01 R
2005/0121536 A1* 6/2005 Bavel .................. A01G 25/165 239/69

(Continued)

FOREIGN PATENT DOCUMENTS

AU 2020104203 A4 * 3/2021 ......... G01N 33/0098
KR 2019/0102722 A1 9/2019

(Continued)

OTHER PUBLICATIONS

Lopez-Bernal et al., A single-probe heat pulse method for estimating sap velocity in trees, Jul. 19, 2017, New Phytologist / vol. 216, Issue 1 , pp. 321-329. (Year: 2017).*

(Continued)

*Primary Examiner* — Kidest Worku
(74) *Attorney, Agent, or Firm* — Debora Plehn-Dujowich; Eckert Seamans Cherin & Mellott LLC

(57) ABSTRACT

A method for determining sap flow velocity, constituted of: providing a heat source and a thermal sensor on a single needle: at a no-flow condition, providing first heat energy to produce a steady state first pre-determined temperature rise: determining a total amount of first heat energy provided to produce the first pre-determined temperature rise: at a flow condition: providing second heat energy to produce a steady state second pre-determined temperature rise: determining a total amount of second heat energy provided to produce the second pre-determined temperature rise: and determining a sap flow rate responsive to the determined total amount of first heat energy and the determined total amount of second heat energy.

8 Claims, 8 Drawing Sheets

(56) References Cited

U.S. PATENT DOCUMENTS

| | | | |
|---|---|---|---|
| 2019/0033109 | A1 | 1/2019 | Lee et al. |
| 2019/0257681 | A1 | 8/2019 | Lee et al. |

FOREIGN PATENT DOCUMENTS

| | | | | |
|---|---|---|---|---|
| KR | 102040182 | B1 * | 11/2019 | ............. G06F 17/10 |
| WO | 2017/123000 | A1 | 7/2017 | |
| WO | 2019/023108 | A1 | 1/2019 | |
| WO | 2019/126100 | A1 | 6/2019 | |

OTHER PUBLICATIONS

Molina et al., Effect of irrigation on sap flux density variability andAgricultural Water Management water use estimate in cherry (*Prunus avium*) for timber production: Azimuthal profile, radial profile and sapwood estimation, Agricultural Water Management, p. 118-126. (Year: 2016).*

International Search Report issued in PCT/IL2022/050444, mailed Jul. 20, 2022.

Written Opinion issued in PCT/IL2022/050444, mailed Jul. 20, 2022.

International Preliminary Report on Patentability issued in PCT/IL2022/050444, mailed Aug. 14, 2023.

Extended European Search Report issued in 22798768.2, mailed Jun. 18, 2024.

* cited by examiner 1000 (OPT.) DETERMINE PARAMETER (ENVIRONMENT)

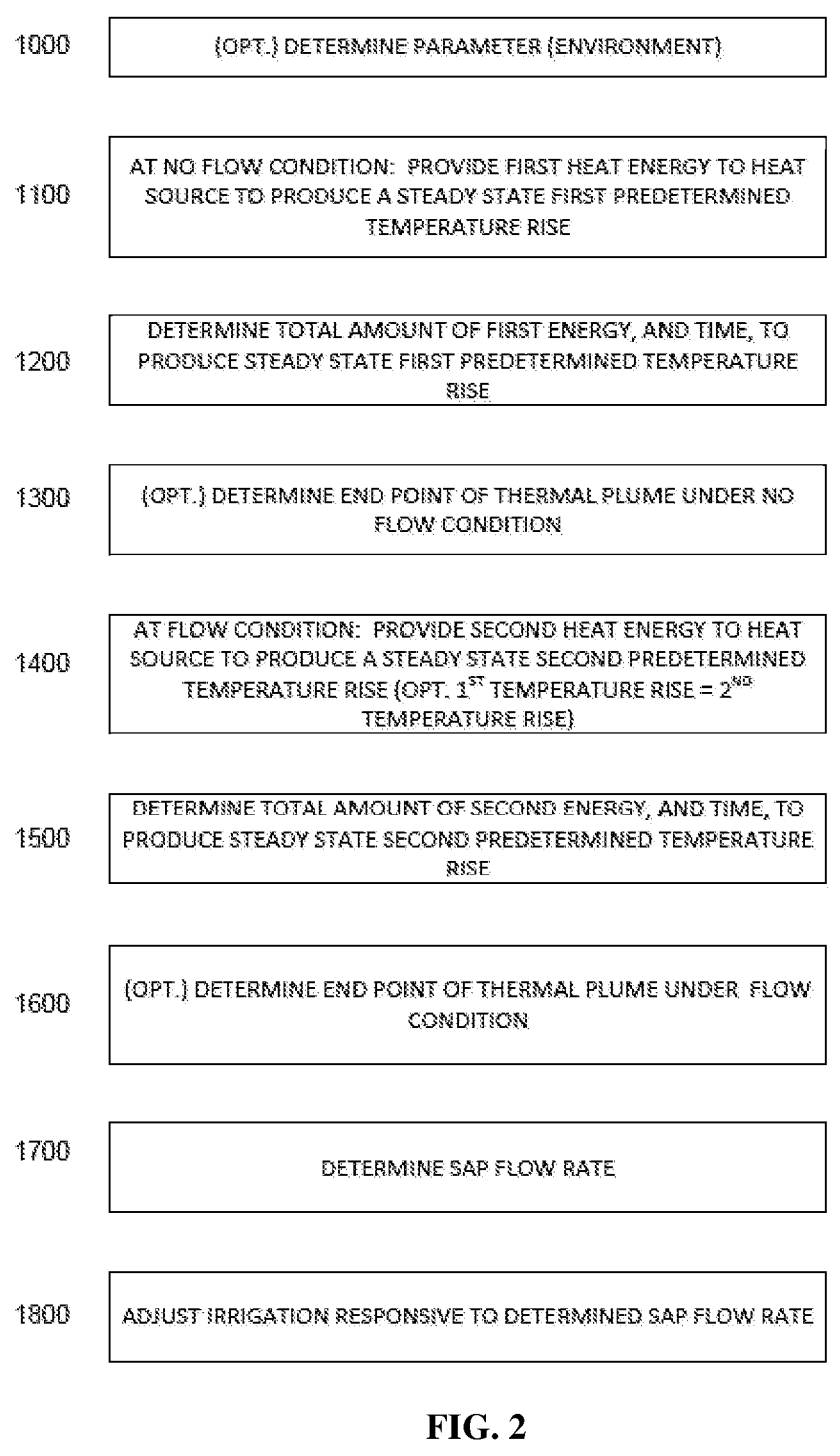

1100 AT NO FLOW CONDITION: PROVIDE FIRST HEAT ENERGY TO HEAT SOURCE TO PRODUCE A STEADY STATE FIRST PREDETERMINED TEMPERATURE RISE

1200 DETERMINE TOTAL AMOUNT OF FIRST ENERGY, AND TIME, TO PRODUCE STEADY STATE FIRST PREDETERMINED TEMPERATURE RISE 1300 (OPT.) DETERMINE END POINT OF THERMAL PLUME UNDER NO FLOW CONDITION

1400 AT FLOW CONDITION: PROVIDE SECOND HEAT ENERGY TO HEAT SOURCE TO PRODUCE A STEADY STATE SECOND PREDETERMINED TEMPERATURE RISE (OPT. 1ST TEMPERATURE RISE = 2ND TEMPERATURE RISE)

1500 DETERMINE TOTAL AMOUNT OF SECOND ENERGY, AND TIME, TO PRODUCE STEADY STATE SECOND PREDETERMINED TEMPERATURE RISE 1600 (OPT.) DETERMINE END POINT OF THERMAL PLUME UNDER FLOW CONDITION

1700 DETERMINE SAP FLOW RATE

1800 ADJUST IRRIGATION RESPONSIVE TO DETERMINED SAP FLOW RATE

FIG. 2

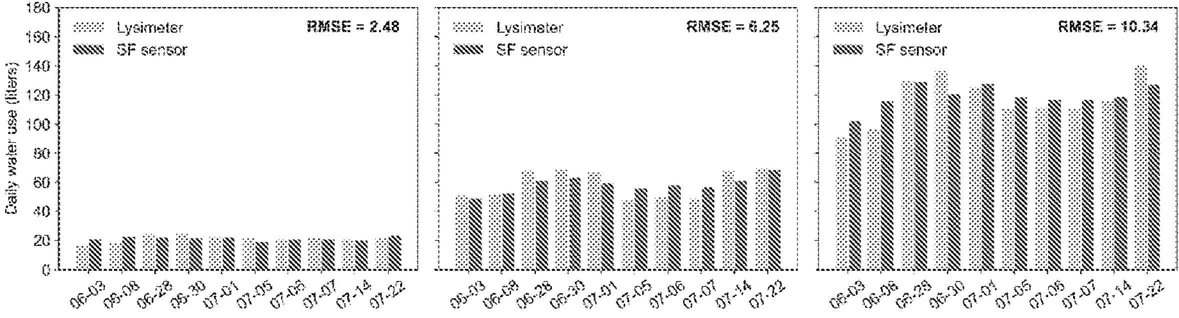
FIG. 9A
FIG. 9B
FIG. 9C
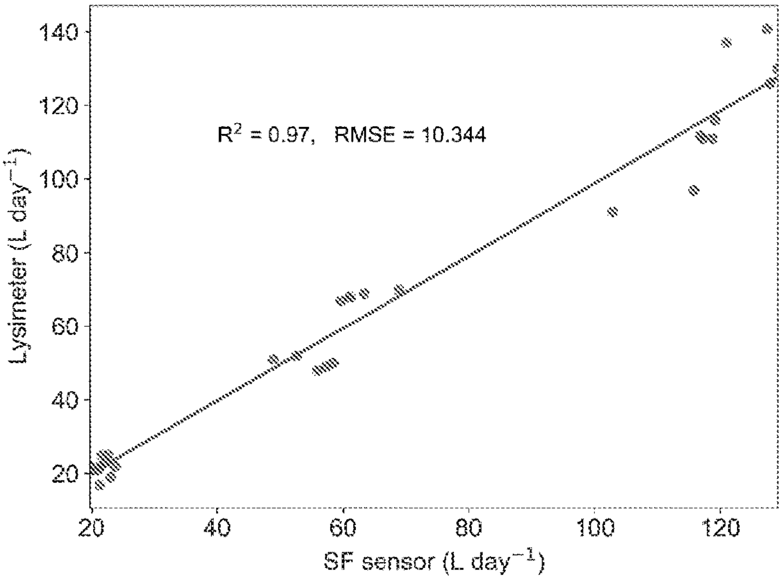
FIG. 10

SAP FLOW SENSOR AND METHOD OF DETERMINING SAP FLOW VELOCITY

CROSS-REFERENCE TO RELATED APPLICATIONS

The present application is a 35 U.S.C. § 371 national phase application from International Application No. PCT/IL2022/050444, filed May 1, 2022, which claims the benefit of priority from U.S. Provisional Patent Application No. 63/184,536, filed May 5, 2021, each of which is hereby incorporated by reference in its entirety.

FIELD OF THE INVENTION

The present invention relates to measurement of sap flow in a tree or other vascular plant.

BACKGROUND OF THE INVENTION

In agriculture, and particularly in the field of arboriculture, it is important to maintain a balance of fluids so that the amount of fluid aspirated is replaced in an equal amount. In the past, soil moisture was used as an analog for the amount of moisture taken by the tree, however this has been shown to be inaccurate.

Measurement of sap flow in a tree has therefore been developed, which generally required multiple sampling points, causing excess damage to xylem tissues. While a single-board tree sap flow sensor has been proposed in WO 2019/126100, published Jun. 27, 2019, it requires multiple layers of temperature sensors, which thus may require a significant thickness of the sap flow sensor, again leading to the aforementioned issue of damage, as well as increased cost.

What is desired, and not provided by the prior art, is an improved single needle sap flow sensor.

SUMMARY OF THE INVENTION

Accordingly, it is a principal object to overcome at least some of the disadvantages of the prior art. This is provided in certain embodiments by a method for determining sap flow velocity, comprising: providing a heat source and a thermal sensor on a single needle; at a no-flow condition, providing first heat energy to produce a steady state first pre-determined temperature rise; determining a total amount of first heat energy provided to produce the first pre-determined temperature rise; at a flow condition; providing second heat energy to produce a steady state second pre-determined temperature rise; determining a total amount of second heat energy provided to produce the second pre-determined temperature rise; and determining a sap flow rate responsive to the determined total amount of first heat energy and the determined total amount of second heat energy.

Independently, a sap flow sensor is enabled, the sap flow sensor comprising: a needle, comprising a plurality of heating elements and a temperature sensor disposed on a single plane; and a control unit in communication with the needle, the control unit arranged to: at a no-flow condition, provide first heat energy by the heating elements to produce a first pre-determined temperature rise thereby producing a no-flow thermal plume; at a flow condition, provide second heat energy by the heating elements to produce a second pre-determined temperature rise thereby producing a flow condition thermal plume; and determine a sap flow rate responsive to a total amount of first heat energy provided to produce the first pre-determined temperature rise and a total amount of second heat energy provided to produce the second pre-determined temperature rise.

It is another object of the present invention to disclose a method for determining sap flow velocity, comprising: providing a heat source and a thermal sensor on a single needle. At a no-flow condition, providing first heat energy to produce a steady state first pre-determined temperature rise; determining a total amount of first heat energy provided to produce the first pre-determined temperature rise, and a first amount of time required to produce the first pre-determined temperature rise. At a flow condition; providing second heat energy to produce a steady state second pre-determined temperature rise; determining a total amount of second heat energy provided to produce the second pre-determined temperature rise and a second amount of time required to produce the second pre-determined temperature rise; and determining a sap flow rate responsive to the determined total amount of first heat energy, the first amount of time, the determined total amount of second heat energy and the second amount of time.

It is another object of the present invention to disclose the method as defined above, comprising: at the no-flow condition, determining an end-point for a no-flow condition thermal plume generated by the provided first heat energy to produce the steady state first pre-determined temperature rise; and at the flow condition, determining an end-point for a flow condition thermal plume generated by the provided second heat energy to produce the steady state second pre-determined temperature rise, wherein determining the sap flow rate is responsive to the determined end-point for the no-flow condition thermal plume and the determined end-point for the flow condition thermal plume.

It is another object of the present invention to disclose the method as defined in any of the above, wherein the first pre-determined temperature rise is equal to the second pre-determined temperature rise.

It is another object of the present invention to disclose the method as defined in any of the above, wherein the first pre-determined temperature rise is equal to the second pre-determined temperature rise.

It is another object of the present invention to disclose the method as defined in any of the above, comprising adjusting irrigation responsive to the determined sap flow rate.

It is another object of the present invention to disclose the method as defined in any of the above, wherein the provided heat source and thermal sensor are on a single plane of the single needle.

It is another object of the present invention to disclose a sap flow (SF) sensor comprising: a needle, comprising a plurality of heating elements and a temperature sensor disposed on a single plane; and a control unit in communication with the needle. The control unit arranged to: at a no-flow condition, provide first heat energy by the heating elements to produce a first pre-determined temperature rise thereby producing a no-flow thermal plume. At a flow condition, provide second heat energy by the heating elements to produce a second pre-determined temperature rise thereby producing a flow condition thermal plume; and determine a sap flow rate responsive to a total amount of first heat energy provided, and a first amount of time required, to produce the first pre-determined temperature rise and a total amount of second heat energy provided, and a second amount of time required, to produce the second pre-determined temperature rise.

It is another object of the present invention to disclose the SF sensor as defined above, wherein the control unit is arranged to: at the no-flow condition, determine an end-point for the no-flow condition thermal plume generated by the provided first heat energy to produce the steady state first pre-determined temperature rise; and at the flow condition, determine an end-point for a flow condition thermal plume generated by the provided second heat energy to produce the steady state second pre-determined temperature rise, wherein determining the sap flow rate is responsive to the determined end-point for the no-flow condition thermal plume and the determined end-point for the flow condition thermal plume.

It is another object of the present invention to disclose the SF sensor as defined in any of the above, wherein the first pre-determined temperature rise is equal to the second pre-determined temperature rise.

It is another object of the present invention to disclose the SF sensor as defined in any of the above, wherein the first pre-determined temperature rise is equal to the second pre-determined temperature rise.

It is another object of the present invention to disclose the SF sensor as defined in any of the above, wherein the control unit is arranged to adjust irrigation responsive to the determined sap flow rate.

It is another object of the present invention to disclose a use of the SF sensor as defined in any of the above for determining sap flow velocity of a plant.

Additional features and advantages of the invention will become apparent from the following drawings and description.

BRIEF DESCRIPTION OF THE DRAWINGS

For a better understanding of certain embodiments and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments only, and are presented in the cause of providing what is believed to be the most useful and readily understood description of the principles and conceptual aspects. In this regard, no attempt is made to show structural details in more detail than is necessary for a fundamental understanding, the description taken with the drawings making apparent to those skilled in the art how the several forms may be embodied in practice. In the accompanying drawings:

FIG. 2 illustrates a high level flow chart of a method of measuring sap flow according to certain embodiments;

FIG. 9 illustrates the daily water uptake (liters/day) for each of the measured trees using a lysimeter (dark gray) and SF sensor (light gray) throughout a period of 10 days. The data was collected from trees with different canopy size and trunk diameter—small (FIG. 9A), medium (FIG. 9B) and large (FIG. 9C);

FIG. 10 illustrates linear regression between the water uptake (liters/day) calculated using a lysimeter and the sap flow (SF) sensor of the present invention. The correlation coefficient of the regression is 0.97, and the RMSE=7.1 L;

DETAILED DESCRIPTION OF THE INVENTION

The present embodiments provide for determining sap flow velocity by a thermal heat transfer analysis based on a single needle sap flow sensor having a self-heating capability and a temperature sensor. First, a steady state heat transfer condition is evaluated under a no-flow condition, taking into account only conduction, and the effective end of the resultant thermal plume is determined. The convective, or advective, term generated by sap flow is then determined during flow conditions responsive to determining an effective end of the thermal plume during flow conditions.

For clarity, since production of a sensor may be made on a single printed circuit board (PCB), or multiple PCBs, the present document uses the term single needle, to indicate that only a single hole need be drilled within the tree, with a single sap flow sensor inserted into the hole, irrespective of construction of the sap flow sensor.

Figure 1:
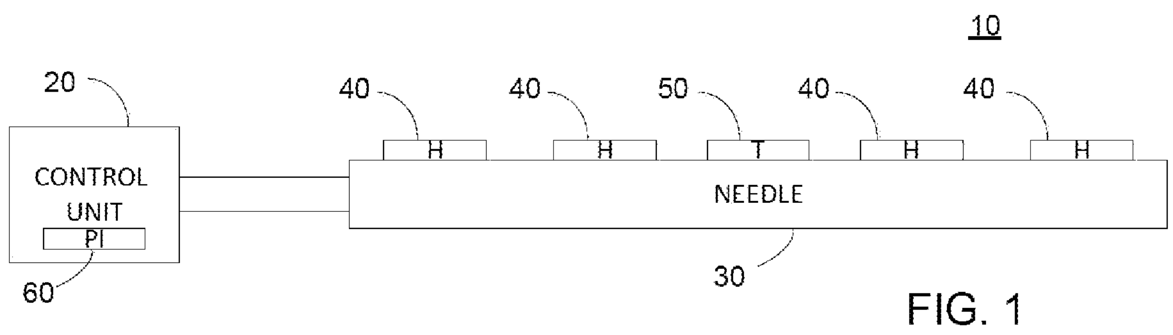
FIG. 1 illustrates a high level block diagram of a sap flow sensor according to certain embodiments.

FIG. 1 illustrates a high level block diagram of a single needle sap flow sensor 10, comprising: a control unit 20; and a needle 30, needle 30 having disposed thereon a plurality of heating elements 40 and a temperature sensor 50. Optionally, control unit 20 comprises a proportional-integral (PI) controller 60. Needle 30 may be constituted of an elongate printed circuit board, which in one non-limiting embodiment has a length of about 25 mm and a thickness of about 2 mm. The plurality of heating elements 40 (of which 4 are illustrated in a non-limiting embodiment), are arranged linearly along a single face of needle 30, with temperature sensor 50 disposed along the single face of needle 30 between a first pair of heating elements 40 and a second pair of heating elements 40. Thus, the plurality of heating elements 40 and temperature sensor 50 are disposed in a single plane.

Needle 30, with heating elements 40 and temperature sensor 50, is coated with an epoxy having high thermal conductivity so as to allow good heat transfer from the heating elements 40 to the environment. The heating elements 40 are connected in series, and are further connected to a first port of control unit 20. The temperature sensor 50 is connected to a second port of control unit 20. Needle 30 is configured to be placed within a matching hole drilled in a tree so as to be within the porous medium of the xylem tissues, and control unit 20 is configured to be external from the measurement point represented by needle 30.

While 4 heating elements 40 are illustrated, this is not meant to be limiting in any way, and more, or less, heating elements 40 may be provided without exceeding the scope. While a single temperature sensor 50 is illustrated, this is not meant to be limiting in any way, and more temperature sensors 50 may be provided along the plane without exceeding the scope. Heating elements 40 may be implemented by surface mount resistors, for example resistors of 10 ohms each for a total of 40 ohms. Temperature sensor 50 may be implemented by thermistors, such as a negative temperature coefficient (NTC) thermistor, or thermal diode, without limitation, which may be provided as surface mount devices.

As indicated above, the heating elements 40 and temperature sensor 50 are disposed along a single face of needle 30, thus forming a linear heater which can be mathematically assumed to be positioned in an infinite homogeneous isotropy porous media, i.e. within the sap flow of the tree without considering boundary conditions. Needle 30 is elongate in the y-direction, with normal sap flow shown as being orthogonal to the y-direction, illustrated here as the x-direction.

The term about as used herein denotes ±25% of the defined amount or measure or value.

The term no-flow condition, as used herein, is reflective of night conditions, or where a sample vascular plant portion is disconnected from any source of moisture. There is no requirement that the no-flow condition exhibit absolute zero flow, and the term is determined as a minimal flow condition. Under the no-flow condition, heat transfer from heat elements 40 is considered to be exclusively by conduction, and the heat transfer generates a thermal plume propagating in a spherical manner, symmetrically. While a thermal plume may be similarly generated in the reverse direction, as well as in the y-direction, this is not relevant to the present analysis.

In operation, and in further connection with FIG. 2, in optional stage 1000, control unit 20 determines parameters of the environment in which needle 30 is generally located (i.e. in a sample under no-flow conditions), and particularly determines control parameters of supplying radiant flux to the heating elements 40 and the resultant response of temperature sensor 50 under open loop conditions.

In one embodiment, control parameters Ki and Kp of optional PI controller 60 are determined under no-flow conditions, by utilizing a thermal-electrical analogy, where Ki represents the integral coefficient, Kp represents the proportional coefficient, Q represent heat energy in Joules expended to arrive at a steady state temperature, q represents the radiant flux, in Joules/second, Ct represents the thermal capacitance, Rt represents the thermal resistance, T represents temperature in degrees Kelvin, and therefore ΔT represents a change in temperature measured over time t. Similarly to Ohm's law, we can establish that:

$$Rt=\Delta T/q \qquad \text{EQ. 1}$$

For a step change of heat conditions, i.e. by applying power to heating elements 40, and measuring the temperature change immediately, we can establish the response, affected by the environment, as:

$$\Delta T(t)=Rt^{*}Q(1-\exp((-t)/\tau_{ol})) \qquad \text{EQ. 2}$$

where $\tau_{ol}$ represents the open loop time constant of the system in the environment as:

$$\tau_{ol}=Rt^{*}Ct \qquad \text{EQ. 3}$$

Performing a Laplace transform of EQ. 2 we receive:

$$L\Delta T(t)=1/s^{*}(Rt/(1+\tau_{ol}s)) \qquad \text{EQ. 4,}$$

where s is the Laplace parameter.

EQ. 3 represents the open loop system Laplace transform temperature response, which can be divided into two separate physical components:
Utilizing control theory, where a set point temperature, X, (in the Laplace domain) is an input to the controller, and the output temperature, Y, (in the Laplace domain is fed back), G—step change response, is 1/s; and H—unit impulse response, is $Rt/(1+\tau_{ol}s)$.

$$G(s)=Kp+Ki/s \qquad \text{EQ. 5,}$$

and therefore:

$$Ki=Kp/\tau_{ol} \qquad \text{EQ. 6}$$

For a closed loop controller, we can write the Laplace function as follows:

$$Y=GH/(1+GH)X=(Kp/Ct)/(S+Kp/Ct) \qquad \text{EQ. 7}$$

and:

$$Kp=Ct/\tau_{cl} \qquad \text{EQ. 8}$$

where $\tau_{cl}$ is the closed loop time constant of the system in the environment The above has been described particularly in relation to a PI controller, however this is not meant to be limiting in any way. For example, a PID controller may be provided in place of PI controller 60, without exceeding the scope.

In stage 1100, control unit 20 energizes heating elements 40 under no-flow conditions so as to achieve a predetermined first predetermined temperature rise, i.e. a first predetermined $\Delta T_1$, sensed by temperature sensor 50, and the first amount of time, $\Delta t_1$, to achieve the first predetermined temperature rise, and total heat energy in Joules, $Q_1$, expended to reach the first predetermined temperature rise is determined. In one example embodiment, PI controller 60 outputs control signals to a pulse width modulation (PWM) unit within control unit 20 to provide controlled heating of heating elements 40 to achieve the first predetermined temperature rise, such as by setting a first set-point temperature for optional PI controller 60. Temperature, as sensed by temperature sensor 50, is monitored by control unit 20, until a steady state condition at the first set point temperature is achieved, i.e. the sensed temperature is unchanged over time, and in stage 1200 and total heat energy Q expended to achieve the steady state first predetermined temperature rise, and the amount of time, $\Delta t_1$, are obtained.

In optional stage 1300, control unit 20, responsive to the determined time, $\Delta t_1$, and total heat energy, $Q_1$, required to reach the first predetermined temperature rise, $\Delta T_1$, determines the effective end-point for the resultant thermal flume under the no-flow condition. Under the no-flow condition, conduction is the only heat transfer mechanism, and heat generated by heating elements 40 create a thermal plume in the porous media. Based on the thermal properties of the porous media we can define the end-point of the thermal plume in the x-axis, denoted Zc1. It is to be noted that the term "end-point", as used herein, is not meant to be absolute, but is instead defined as being a temperature change due to the thermal plume generated by heating elements 40 of below a predetermined value. In one example, the predetermined value, which is based on the maximum sensitivity of the sensing equipment, is 0.01° K.

The needle is modelled, in 2 dimensions, as a point in infinite space extending in the x, y coordinates. The point is assumed to be immersed in a medium of uniform velocity, here taken to be $U_0$. So, the model considers conduction, and under flow conditions, convection (or advection), which will disperse the thermal plume around the needle according to the field velocity of the fluid, within the framework of energy conservation in an incompressible fluid with no internal heat generation.

In order to further clarify the operation, we further elaborate mathematically. The partial differential heat equation in one dimensional medium is:

$$\partial T/\partial t=\alpha(\partial^2 T)/(\partial x^2) \quad \text{EQ. 8}$$

where α represents the thermal diffusivity of the fluid, T represents the temperature change as a result of the heat generated by heating elements 40, t represents the time, and x represents distance from the needle. The analytical solution of EQ. 7 for a radial geometry under conduction only, i.e. the no-flow condition, is:

$$T(x,t)=q/4\pi kx\cdot erfc(x/(2\sqrt{\alpha t})) \quad \text{EQ. 9}$$

where "erfc" stands for the error function (also known as the Gauss error function), and k represents thermal conductivity of the fluid. It is to be understood, that in optional stage 1300, t in EQ. 9 is $\Delta t_1$.

When convection (or advection) caused by fluid flow at velocity $U_0$ is taken into account, the governing equation is:

$$\rho c_p\left(\frac{\partial T}{\partial t}+U_0\frac{\partial T}{\partial x}\right)=k\left(\frac{\partial^2 T}{\partial x^2}+\frac{\partial^2 T}{\partial y^2}\right), \quad \text{EQ. 10}$$

where ρ, $c_p$ are the density and heat capacity of the fluid, respectively. The density and heat capacity of the fluid, are known quantity for most conditions, such as a specific tree sap, and can be measured for others.

The following initial and boundary conditions are assumed:

$$T(x,y,0)=T_0 \quad \text{EQ. 11}$$

$$T(x\to\infty,y\to\infty,t)=0 \quad \text{EQ. 12}$$

This means that the $T_0$ is the temperature at time 0, (i.e. with no change caused by heat generated by heating elements 40) at all points along the x, y planes, and the temperature change at infinity of the x, y planes is zero for any time period. At normal rates of fluid flow during flow conditions we assume that the Peclet number $U_0L/\alpha>>1$, where L represents the length parameter that describes the scale problem, so we can neglect diffusion in the x direction.

Once we have reached steady state under no-flow conditions, we may re-write EQ. 10, for a flow condition, as:

$$U_0\frac{\partial T}{\partial x}=\alpha\frac{\partial^2 T}{\partial y^2}, \quad \text{EQ. 13}$$

which may be solved for, with a continuous steady state heat source at the origin as:

$$T(x,t)=q/2\pi kx*\exp(-(U_0*y^2)/2\alpha x) \quad \text{EQ. 14}$$

where q represents radiant flux of the heating elements 40 at the steady state no-flow condition.

EQ. 9, is then solved numerically to arrive at Z1, i.e. the end-point of the heat plume in the x-axis under no-flow conditions, denoted Z1. As indicated above, T at Z1 is set to the predetermined value, which is based on the maximum sensitivity of the sensing equipment, e.g. 0.01° K.

In stage 1400, control unit 20 energizes heating elements 40 under flow conditions so as to achieve a predetermined second temperature rise $\Delta T_2$ as sensed by temperature sensor 50, and the total second amount of time, $t_2$, and in stage 1500 total heat energy, $Q_2$, required to reach the predetermined second temperature rise $\Delta T_2$ is determined. In one example embodiment, PI controller 60 outputs control signals to a pulse width modulation (PWM) unit within control unit 20 to provide controlled heating of heating elements 40 to achieve the second predetermined temperature rise, such as by setting a second set-point temperature for optional PI controller 60. Temperature, as sensed by temperature sensor 50, is monitored by control unit 20, until a steady state condition at the second set point temperature is achieved, i.e. the sensed temperature is unchanged over time. There is no requirement for the second predetermined temperature rise of stage 1400 be identical with the first predetermined temperature rise of stage 1100; neither is there a requirement that the second predetermined temperature rise of stage 1400 be different from the first predetermined temperature rise of stage 1100.

During flow conditions, the thermal plume will be asymmetric in the x-axis, and it can evaluated numerically responsive to: 1) the total amount of heat energy generated, $Q_2$, to achieve steady state at the second set point temperature, $\Delta T_2$; and 2) a temperature decay exponential pattern.

The area, Ap, under the ellipsoid thermal plume, is equal to:

$$Ap=\pi*Z1*Z2 \quad \text{EQ. 15}$$

where Z2 is the end-point of the heat plume in the x-axis under flow conditions. Based on the energy conservation of the thermal plume, we can derive:

$$\int_0^{\Delta t2} q_2\,dt = C_p\int\int_{0\,0}^{Z2\,Z1} T\,dx\,dy \quad \text{EQ. 16}$$

where $q_2$ represents the radiant flux under flow conditions, and $\Delta t_2$ represents time to steady state under flow conditions.

The temperature distribution should exhibit an exponential decay pattern and within the second set point temperature $\Delta T_2$ along the x-axis, i.e. parallel to the flow direction, define a decay parameter β. We can express the temperature distribution as $$T(x)=\frac{1}{\Delta Tx}\cdot\mathrm{erfc}\left(\frac{x}{\beta}\right) \quad \text{EQ. 17}$$

In the y-axis, i.e. orthogonal to the flow direction, there is no convection, so at steady state the temperature distribution is governed by EQ. 14. If we put EQ. 17 and EQ. 9 inside EQ. 16, and integrate it, we can find β and in optional stage 1600 we determine Z2, which as indicated above is the end-point of the thermal plume on the x-axis during flow conditions.

The integration of the left side is equal to the total amount of heat energy the control unit 20 generates until steady state, i.e. $Q_2$, and can be expressed as:

$$Q_2 = C_p \int\int_{0\ 0}^{Z2\ Z1} T dx dy \quad \text{EQ. 18}$$

Solving EQ. 18 numerically for Z2, thus provides information regarding the end-point of the thermal plume in the x-axis during flow conditions. Based on empirical testing, a calibration factor is determined, denoted ζ, and the sap flux density, SFD, is then determined as:

$$SFD = \zeta \frac{Z2 - Z1}{\Delta t2} \quad \text{EQ. 19}$$

The derived SFD provides indication of the flow rate per unit area, and thus provides the agriculturist the requisite information to determined irrigation needs, in combination with measurement of the tree girth. In one embodiment, control unit 20 is in communication with a cloud server, and outputs the derived SFD to a server. The server is in communication with an irrigation system, and in stage 1600, adjusts irrigation action, by advancing, retarding, increasing or decreasing irrigation responsive the derived SFD.

Example 1

Validation of the Measurement Method of the Present Invention Using Continuous Gravimetric Sensing in Young Pear Trees In order to validate the measurement method, we performed a potted plant experiment that makes it possible to estimate the flow of water in the stem using continuous gravimetric sensing.

Four young pear trees (3 years old) were planted in 50-liter pots with a planting substrate based on a mixture of peat, compost and tuff. The substrate was covered with plastic in order to prevent evaporation from the substrate and to allow the flow, from the trees only, to be estimated. The four trees were installed on top of an electronic weighing system, and the weight data was sampled once every ten minutes.

In each tree, a sap flow sensor according the present embodiments, commercial dendrometry sensors (results not shown) and soil moisture sensors (volumetric moisture content) were installed on the stem. A meteorological station was installed next to the tree weighing station, which included temperature and humidity sensors, solar radiation, and wind power.

Through the weight changes over time, the momentary and daily transpiration from the trees were calculated. Based on the assumption of hydraulic continuity and the neglect of water capacity in wood, i.e. that the water loss from the tree is equal to the flow, and there is no change in the water capacity in the trunk, branch, or leaves, a temporal series of sensor measurements were compared with transpiration measurements.

Figure 3:
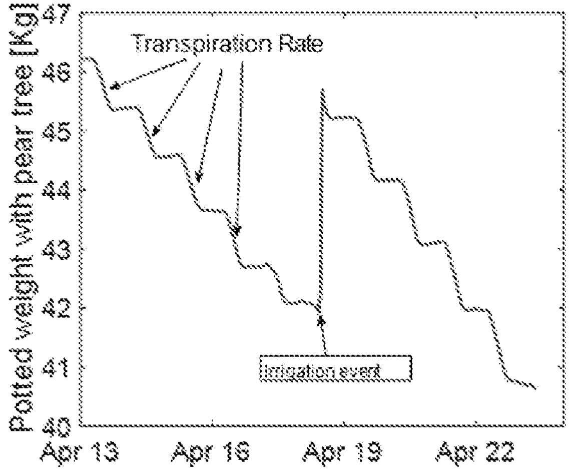
FIG. 3 illustrates experimental results of four trees over a periodic course of weight readings.

FIG. 3 illustrates the daily weight changes resulting from the water flow by the tree over a periodic course of weight readings. On April 19, a complete irrigation was provided to return the moisture in the pot to a state of pot capacity. FIG. 3 thus illustrates 10 days of weight measurement of a particular pot.

Figure 4:
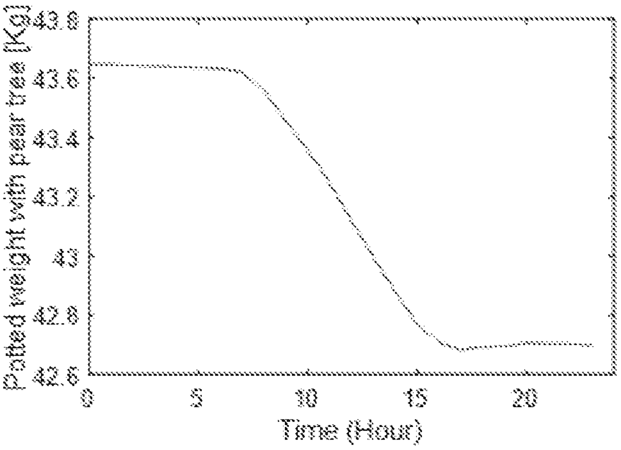
FIG. 4 illustrates experimental results of weight reduction over the course of a day.

The weight reduction can be seen over the course of a day in FIG. 4, particularly from 07:00 to 17:00. During these hours the transpiration rate varied depending on the atmospheric conditions. The rate of transpiration is calculated from the derivative of weight changes throughout the day.

Figure 5:
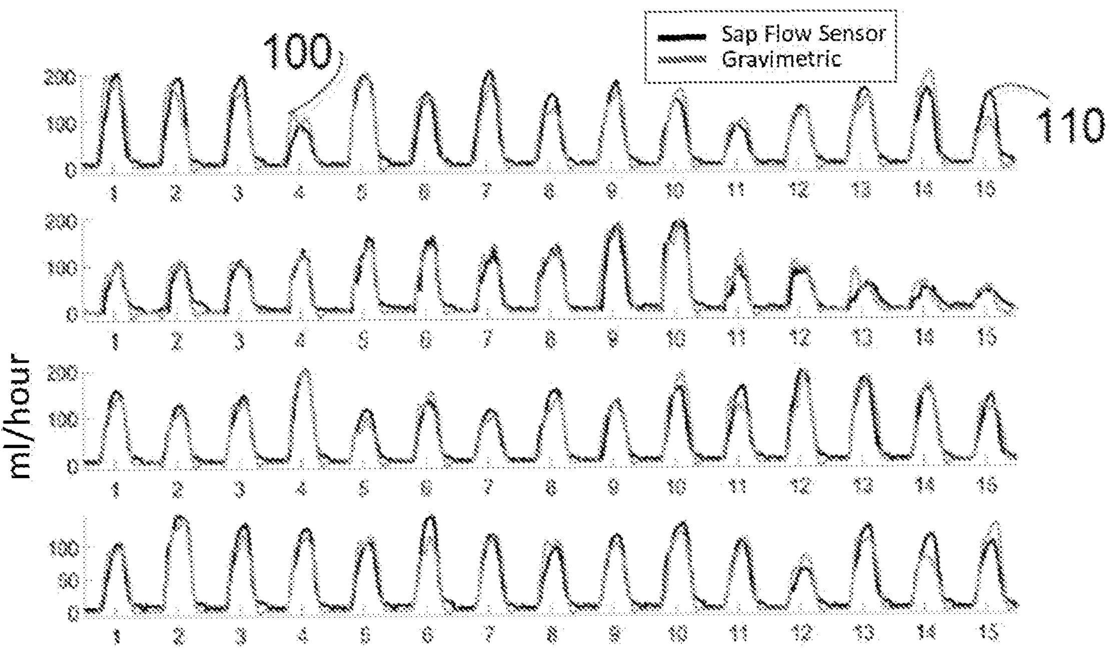
FIG. 5 illustrates results of the four trees over a 15-day period.

FIG. 5 illustrates measurement results of the four trees over a 15-day period. The bright curve, 100, indicates transpiration measurements as calculated from the weight readings, and the dark curve, 110, indicates transpiration as determined according to the present embodiments. A close correlation between the results of the two methods is seen.

Figure 6:
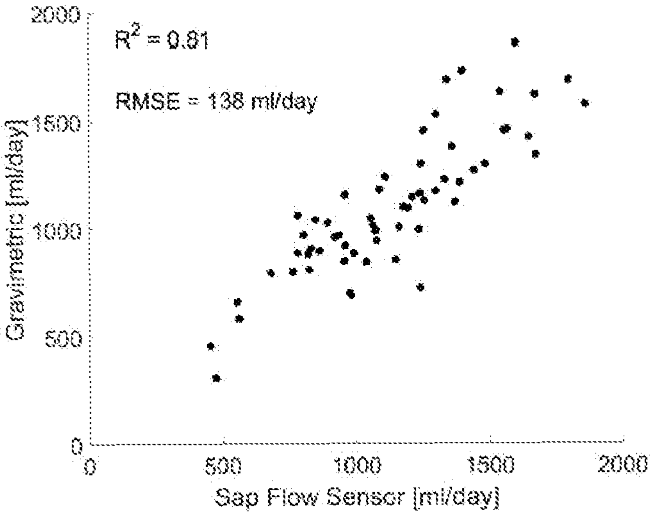
FIG. 6 illustrates a comparison of measurement values of the present embodiment vs. daily transpiration values as determined by continuous gravimetric measurement.

FIG. 6 illustrates a comparison of measurement values of the present embodiment vs. daily transpiration values as determined by continuous gravimetric measurement. In particular, FIG. 6 illustrates a statistical summary of comparing daily water consumption based on the present embodiments and reference values, where reference values are gravimetric measurements. The results of the comparison show a very good match or correlation in the total flow values throughout the day (R2=0.81), with an 11.2% error rate of the transpiration array, where each color represents a different tree in the array of trees.

Example 2

Validation of the Measurement Method of the Present Invention Using a Lysimeter, in Almond Tree Seedlings In order to further validate the sap flow velocity measurement method of the present invention, a potted plant experiment that estimate water loss from the plant using a lysimetric device (transpiration measurement via gravimetric method) was performed in young almond trees.

In this experiment, four almond tree seedlings were planted in 50-liter pots with substrate based on peat, coconut and tuff. The four pots were placed on an electronic weighing system (lysimeters). The system collected the weight data continuously every 10 minutes. The sap flow measurements (using the method and sensor of the present invention) was performed in the trunk of the plant, every half an hour.

The data processing was done on a daily interval and the comparison was calculated using the amount of daily water consumption. On days 6 and 14 of the experiment, the pots were irrigated, so the weight data were not reliable on these days.

Figure 7:
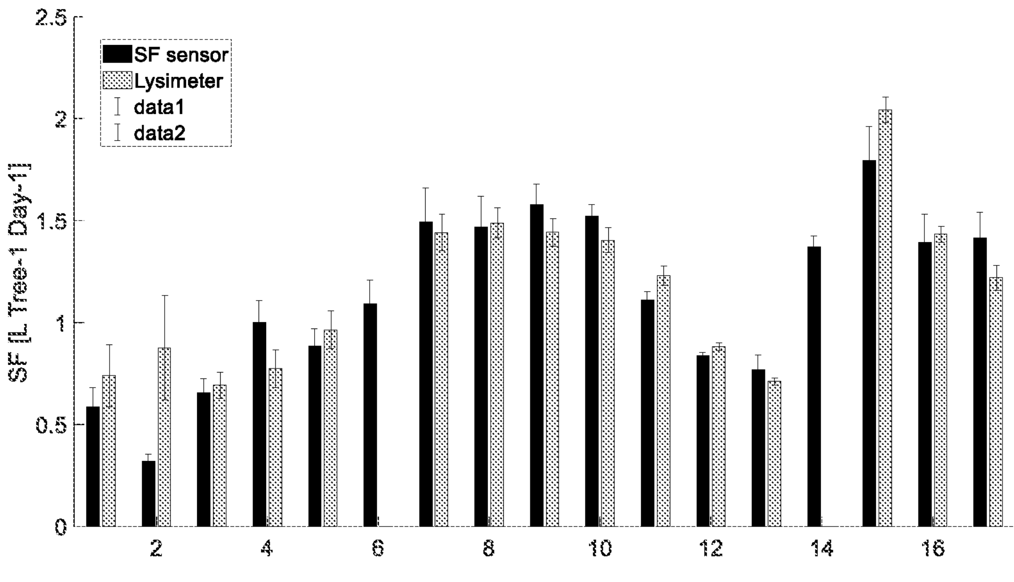
FIG. 7 illustrates a comparison of measurement of the daily water uptake (liters/day) mean value of 4 trees using a lysimeter (gray) and the sap flow (SF) sensor of the present invention (dark gray) throughout 17 days. The vertical lines represent the standard errors of the mean (SE)

FIG. 7 illustrates a graphic comparison of measurement of the daily water uptake (liters/tree/day) mean value of 4 trees using a lysimeter (gray) and the sap flow (SF) sensor of the present invention (dark gray) throughout 17 days. In days 6 and 14, irrigation was applied to the soil tanks, therefore the daily uptake could not be calculated. SF stands for sap flow. The vertical lines represent the standard errors of the mean (SE) values.

The results of the comparison shows that the measurement error of the sap flow sensor technology of the present invention is between about 10%-15%, particularly about 14.5% on average. This is in comparison to conventionally used laboratory measurement methods, which require weighing the plant and determining its mass change over time.

Figure 8:
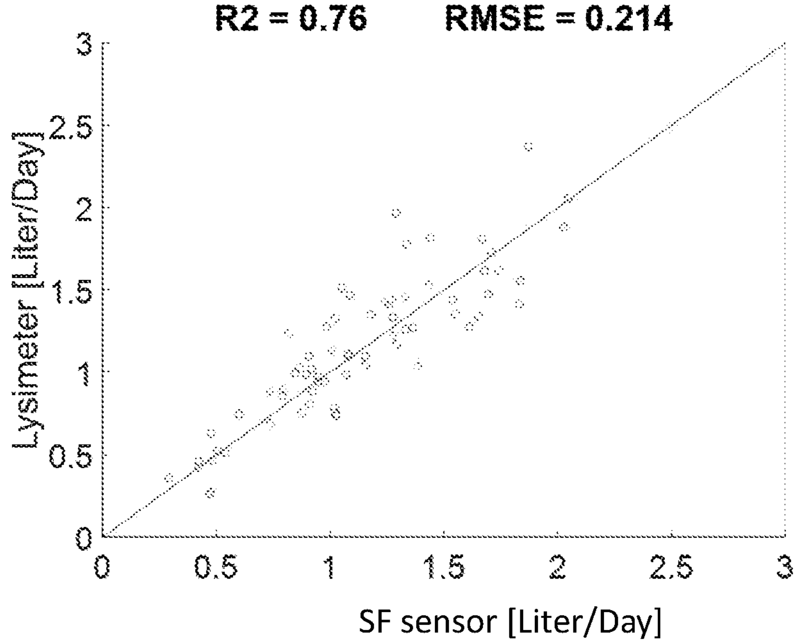
FIG. 8 illustrates linear regression between the water uptake (liters/day) calculated using a lysimeter and the sap flow (SF) sensor of the present invention. The correlation coefficient of the regression is 0.76, and the RMSE=0.214 L.

FIG. 8 presents a statistical analysis of the linear regression between the sap flow sensor (SF) of the present invention and the lysimeter measurements. The graph shows a linear regression between the water uptake (liters/day) calculated using a lysimeter and the sap flow (SF) sensor. The calculated correlation coefficient of the regression is 0.76, and the root mean squared error (RMSE)=0.214 L (liter). This statistical analysis verifies the correlation and matching between SF sensor measurement results and the actual water uptake of the plant as measured by calculating weighing difference of the plant.

In summary, the results above demonstrate that the method for determining sap flow velocity of the present invention is capable of predicting water uptake of a plant, specifically a tree, accurately and efficiently in real time, without the need to weigh the plant or otherwise negatively affecting the plant development and conditions.

Example 3

Validation of the Measurement Method of the Present Invention Using a Lysimeter, in Avocado Trees In order to further validate the sap flow velocity measurement method of the present invention, a potted plant experiment that estimate water loss from the plant using a lysimetric device (transpiration measurement via gravimetric method) was performed in avocado trees. An experiment was conducted to calibrate the sap flow (SF) sensors of the present invention in mature avocado trees by measuring the water consumption of the trees by lysimeters.

The SF sensor was installed in about 3 avocado trees of different sizes. The trees were planted in 300-liter (L) pots. The water consumption was measured 10 times throughout the experiment.

Reference is now made to FIG. 9, presenting a comparison of the water consumption of the trees. In dark gray the lysimeter measurements, in light gray the measurements of the sensors (FIG. 9A; small tree, FIG. 9*b*; medium tree; FIG. 9C; large tree). This figure describes daily water uptake (liters/day) for each of the measured trees using a lysimeter (dark gray) and SF sensor (light gray) throughout a period of 10 days. The data was collected from trees with different canopy size and trunk diameter—large (FIG. 9C), medium (FIG. 9B) and small (FIG. 9A).

The above described experimental results clearly show a good correlation or matching between the two measurement methods.

FIG. 10 illustrates linear regression between the water uptake (liters/day) calculated using a lysimeter and the SF sensor of the present invention, for all the measured trees. The comparison between the measurement methods shows that the measurement error of the SF sensor stands at about 11% on average, the correlation coefficient is 0.97 and the RMSE=7.1 L.

To summarize, a good correlation and matching was found by the water uptake measurement using a gravimetric method (e.g. lysimeter) and the sap flow velocity measurement method using the SF sensor of the present invention. The observed measurement error of the sap flow sensor technology of the present invention was between 10%-15%. These results demonstrate that the sap flow velocity measurement method of the present invention can accurately calculate water uptake of the plant in a continuous way, throughout the day, on site (in the field or any planting area such as orchard), without disturbing the plant development.

Example 4

Validating the Sap Flow Velocity Measurement Method in Field Trials in Commercial Orchards Under Diverse Irrigation Regimes This example summarizes the results of two commercial field experiments: (a) in wine grapes; and (b) in apples. During the summer, two field trials were conducted in commercial orchards with the aim of testing the sap flow (SF) sensor technology of the present invention under diverse irrigation regimes.

(a) The following is a description of the experiment and the results in the wine vineyard:

The experiment included hourly monitoring of the sap flow in the vine and comparison with the water doses that the farmer conducted in the experiment plot.

Figure 11:
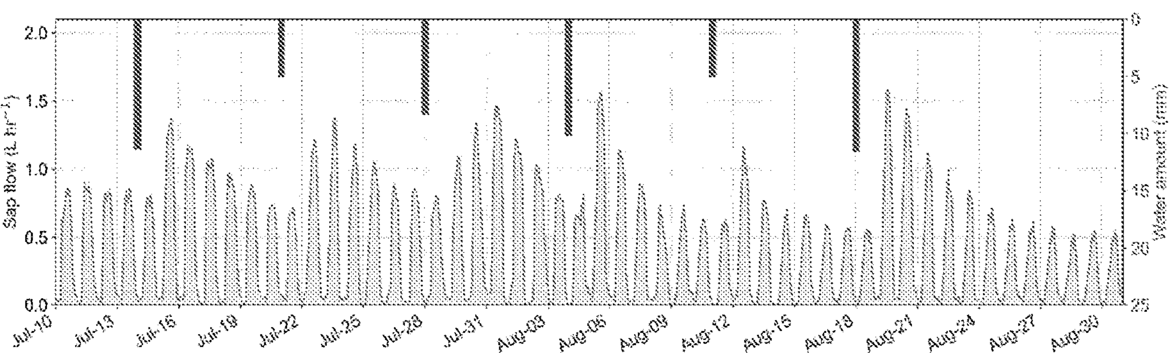
FIG. 11 illustrate the water uptake (light gray, liters/hour) response of vines to irrigation events during the season (stage 3, past "Veraison"), as measured by the sap flow velocity measurement method of the present invention. Irrigation amounts are represented in bars (dark gray, mm)

FIG. 11 illustrate the water uptake (light gray, liters/hour) response of vines to irrigation events during the season (stage 3, past "Veraison"). Irrigation amounts are represented in bars (dark gray, mm).

It can be clearly seen that the sap flow intensity or rate throughout the day as measured by the method of the present invention was in proportion or correlation to and in response to the irrigation events.

As shown in FIG. 11, the day after irrigation, the sap flow values increased significantly between 1.3 and 3 times. Immediately thereafter, a gradual decrease in the rate of the daily sap flow began, until the next irrigation.

In summary, it can be seen that the response to each of the 6 irrigations given is different and is related to the degree of dryness in the soil and the dose of water given. However, these findings show that the measurement results are consistently in accordance with the state of the water in the soil and in accordance with the irrigation events.

(b) The following is a description of the experiment and the results in an apple orchard:

A second experiment was conducted in an apple orchard, where the sap flow (SF) sensor of the present invention was tested for its response to prolonged tree thirst. The sensor was installed in the tree on June $20^{th}$, and until July $4^{th}$, a daily dose of water was applied as prescribed by the farmer. The tree was not watered for 14 days between July $4^{th}$ and July $18^{th}$.

Figure 12:
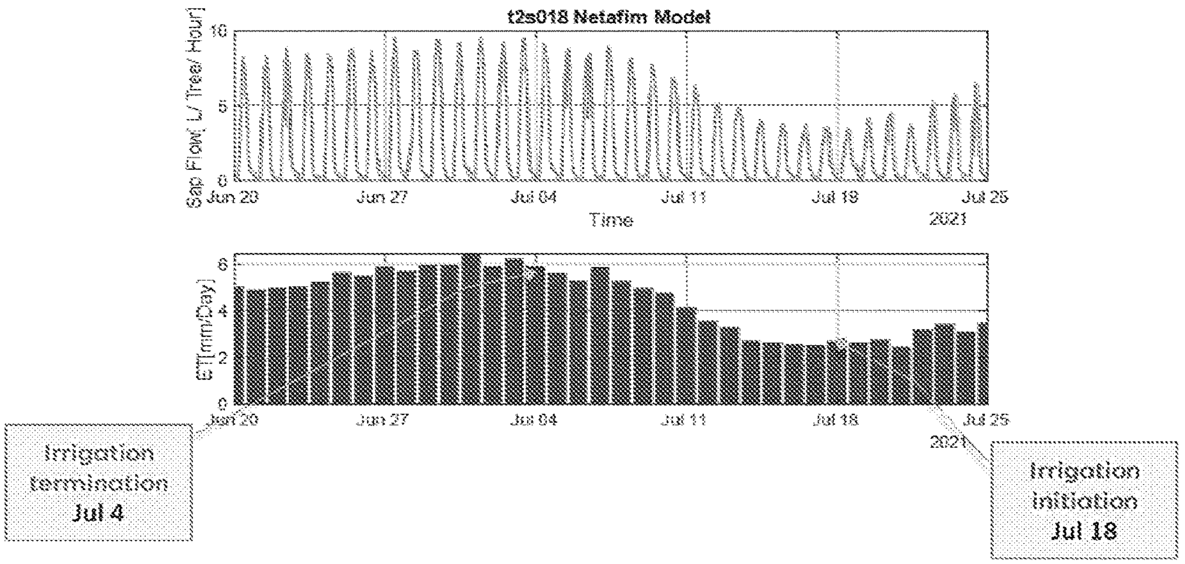
FIG. 12 illustrates the water uptake (liters/hour) response of apple trees to irrigation cutoff during season. Results in the upper chart are presented as hourly sap flow (liters/hour), the bottom chart presents the daily water uptake (T, mm/day), where T stands for transpiration.

FIG. 12 illustrates the water uptake (liters/hour) response of apple trees to irrigation cutoff during the season. Results in the upper chart are presented as hourly sap flow (liters/hour), the bottom chart presents the daily water uptake (T, mm/day), where T stands for transpiration. This figure shows the results of the sap flow rate at an hourly resolution in liters per tree per hour. In this figure, the daily transpiration is calculated using the hourly value presented in the upper scheme, and converted to mm of water consumed per day in the lower scheme.

It is demonstrated in the figure that within two days of ceasing the irrigation, the sap flow in the tree decreased consistently. The decrease continued, and after ten days, the daily sap values stabilized at a fixed lower level. On July $18^{th}$ (irrigation initiation), there was a recovery in the tree, and the sap flow increased gradually.

The results above demonstrate that the sap flow velocity rate measurements performed with the SF method and sensor of the present invention are responsive and show a good correlation with the water content in the soil and with irrigation events. This is shown in laboratory, as well as field conditions, with various crop or tree types in various growth stages. Thus the sap flow velocity measurement method of the present invention is capable of calculating and predicting the plant's water flow rate continuously, throughout the day, in commercial orchards, and adjusting the irrigation accordingly. Therefore, the method of the present invention enable to adjust irrigation according to the plant real water needs (encompassing uptake and transpiration of water).

In addition, power usage of the present embodiments is improved over the prior art, since power consumption is proportional to the flow rate, and thus during no-flow, or low-flow conditions (such as nighttime), little power is wasted.

The present embodiments advantageously utilize the volumetric environment of the needle and not just the physics of the boundary between the needle and the wood, thus reducing the measurement error caused as a result of the variability of the thermal properties at the point of installation and the drill.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

The invention claimed is:

1. A method for determining for determining sap flow density, comprising:

under a no-flow condition:

supplying a first heat energy to a plant-inserted, single needle sap flow sensor so as to achieve a pre-determined steady state temperature;

generating a no-flow temperature distribution, wherein the no-flow temperature distribution is calculated in accordance with a temperature distribution equation:

$$T(x) = \frac{1}{\Delta T} \cdot \mathrm{erf}c\left(\frac{x}{\beta}\right)$$

wherein:

x is distance from the needle in a direction parallel to a flow direction,

T(x) is temperature as a function of x,

ΔT is a change of temperature, erfc is a Gauss error function,

β is a decay parameter;

determining a no-flow heat plume endpoint Z1 displaced in an x-axis under the no-flow condition;

under a flow condition:

supplying a second heat energy to the plant-inserted, single needle sap flow sensor so as to achieve the pre-determined steady state temperature;

generating a flow temperature distribution, wherein the flow temperature distribution is calculated in accordance with the temperature distribution equation;

determining a flow heat plume endpoint Z2 displaced in an x-axis under the flow condition wherein the determining the no-flow heat plume endpoint Z1 and the flow heat plume endpoint Z2 is implemented by numerically solving a heat balance equation under the no-flow condition and the flow condition, respectively, wherein the heat balance equation is:

$$Q_2 = C_p \int_0^{Z2} \int_0^{Z1} T dx dy$$

wherein:

$Q_2$ is the total heat energy supplied until steady state,

Cp is fluid heat capacity, x is distance from the needle in a direction parallel to flow direction, y is distance from the needle orthogonal to flow direction; and calculating the sap flow density (SFD) in accordance with a difference between heat plume endpoints Z2 and Z1 and times needed to achieve the pre-determined steady state temperature in no-flow and flow conditions, wherein calculating the SFD is implemented in accordance with:

$$SFD = \zeta \frac{Z2 - Z1}{\Delta t2}$$

wherein:

ζ is a calibration factor,

Δt2 represents time to steady state under flow condition.

2. The method of claim 1, further comprising adjusting irrigation responsively to the sap flow density.

3. The method of claim 1, wherein the single needle sap flow sensor has a heat source and thermal sensor on a single plane.

4. A sap flow (SF) sensor comprising:

a single needle, comprising a heat source and a thermal sensor; and a control unit in communication with the needle, the control unit arranged to:

under a no-flow condition:

supply a first heat energy to the plant-inserted single needle, so as to achieve a pre-determined steady state temperature;

calculate a no-flow temperature distribution, wherein the no-flow temperature distribution is calculated in accordance with a temperature distribution equation:

$$T(x) = \frac{1}{\Delta T} \cdot \mathrm{erf}c\left(\frac{x}{\beta}\right)$$

wherein:

x is distance from the needle in a direction parallel to a flow direction,

T(x) is temperature as a function of x,

ΔT is a change of temperature, erfc is a Gauss error function,

β is a decay parameter;

determine a no-flow heat plume endpoint Z1 displaced in an x-axis under the no-flow condition;

under a flow condition:

supply a second heat energy to the plant-inserted single needle, so as to achieve the pre-determined steady state temperature;

calculate a flow temperature distribution, wherein the flow temperature distribution is calculated in accordance with the temperature distribution equation;

determine a flow heat plume endpoint Z2 displaced in an x-axis under the flow condition wherein the determining the no-flow heat plume endpoint Z1 and the flow heat plume endpoint Z2 is implemented by numerically solving a heat balance equation under the no-flow condition and the flow condition, respectively, wherein the heat balance equation is:

$$Q_2 = C_p \int_0^{Z2} \int_0^{Z1} T dx dy$$

wherein:

$Q_2$ is the total heat energy supplied until steady state,

Cp is fluid heat capacity, x is distance from the needle in a direction parallel to flow direction, y is distance from the needle orthogonal to flow direction; and calculate the sap flow density (SFD) in accordance with a difference between heat plume endpoints Z2 and Z1 and times needed to achieve the pre-determined steady state temperature in no-flow and flow conditions, wherein calculating the SFD is implemented in accordance with:

$$SFD = \zeta \frac{Z2 - Z1}{\Delta t2}$$

wherein:

ζ is a calibration factor,

Δt2 represents time to steady state under flow condition.

5. The SF sensor of claim 4, wherein the control unit is arranged to adjust irrigation responsively to the sap flow density.

6. The SF sensor of claim 4, wherein the heat source and the thermal sensor are disposed on a single plane.

7. The SF sensor of claim 4, wherein the single needle comprises a plurality of heating elements.

8. Use of the SF sensor of claim 4 for determining sap flow density of a plant.

* * * * *